United States Patent
Leonard et al.

(10) Patent No.: US 10,360,522 B1
(45) Date of Patent: Jul. 23, 2019

(54) UPDATING A FORECAST BASED ON REAL-TIME DATA ASSOCIATED WITH AN ITEM

(71) Applicant: Amazon Technologies, Inc., Seattle, WA (US)

(72) Inventors: Edward Michael Leonard, Snoqualmie, WA (US); Robert Howard Sawers, Seattle, WA (US); Kip Christopher Larson, Seattle, WA (US); Devesh Mishra, Snoqualmie, WA (US); Eric Mathew Mack, Seattle, WA (US); Jeffrey B. Maurer, Port Orchard, WA (US)

(73) Assignee: Amazon Technologies, Inc., Seattle, WA (US)

( * ) Notice: Subject to any disclaimer, the term of this patent is extended or adjusted under 35 U.S.C. 154(b) by 755 days.

(21) Appl. No.: 14/749,016

(22) Filed: Jun. 24, 2015

(51) Int. Cl.
*G06Q 10/06* (2012.01)

(52) U.S. Cl.
CPC .............. *G06Q 10/06315* (2013.01)

(58) Field of Classification Search
None
See application file for complete search history.

(56) References Cited

U.S. PATENT DOCUMENTS

| 5,712,985 | A  | * | 1/1998  | Lee | G06Q 30/0202 |
| | | | | | 705/7.31 |
| 7,058,587 | B1 | * | 6/2006  | Horne | G06Q 10/06 |
| | | | | | 705/7.22 |
| 2002/0116348 | A1 | * | 8/2002  | Phillips | G06Q 30/02 |
| | | | | | 705/400 |
| 2006/0190361 | A1 | * | 8/2006  | Greenbaum | G06Q 10/04 |
| | | | | | 705/28 |
| 2009/0327034 | A1 | * | 12/2009 | Petersen | G06Q 10/087 |
| | | | | | 705/14.4 |
| 2011/0196718 | A1 | * | 8/2011  | Kulkarni | G06Q 10/00 |
| | | | | | 705/7.31 |

* cited by examiner

*Primary Examiner* — Eric W Stamber
*Assistant Examiner* — Arif Ullah
(74) *Attorney, Agent, or Firm* — Kilpatrick Townsend & Stockton LLP

(57) ABSTRACT

Techniques for generating a forecast associated with an item may be described. For example, the forecast may be generated based on simulations of supply and demand variables associated with the item over a planning horizon. The forecast may include at least one of: a labor forecast or a capacity forecast associated with inventorying units of the item in an inventory over the planning horizon. Further, real-time data associated with realizations of the supply and demand variables during the planning horizon may be monitored. At least a portion of the real-time data may be available from a management system. The management system may be configured to manage orders for the units of the item from the inventory. The forecast may be updated during the planning horizon based on the real-time data. The update may include changing the at least one of: the labor forecast or the capacity forecast.

19 Claims, 6 Drawing Sheets

UPDATING A FORECAST BASED ON REAL-TIME DATA ASSOCIATED WITH AN ITEM

BACKGROUND

More and more users are turning to network-based resources, such as electronic marketplaces, to purchase items (e.g., goods and/or services). For example, the network-based resource may offer a larger and more diverse selection of items. Further, for some of the items, there may be a number of sellers with different offers. As such, a customer may not only have access to a rich item selection, but may also obtain items at the most convenient offers.

A service provider of a network-based resource may coordinate with multiple entities to offer items. For example, the service provider may communicate with sellers to list the items at the network-based resource and with inventory planners to acquire and store a certain number of the items in storage. Some or all of these entities may rely on forecasts about the items to plan for providing, acquiring, storing, and offering the items as available from the network-based resource. Typically, each entity may manage its own forecast independently of other entities. Further, a forecast may be managed following a batch approach for a period of time during which the forecast may not be updated.

BRIEF DESCRIPTION OF THE DRAWINGS

Various embodiments in accordance with the present disclosure will be described with reference to the drawings, in which.

DETAILED DESCRIPTION

Figure 1:
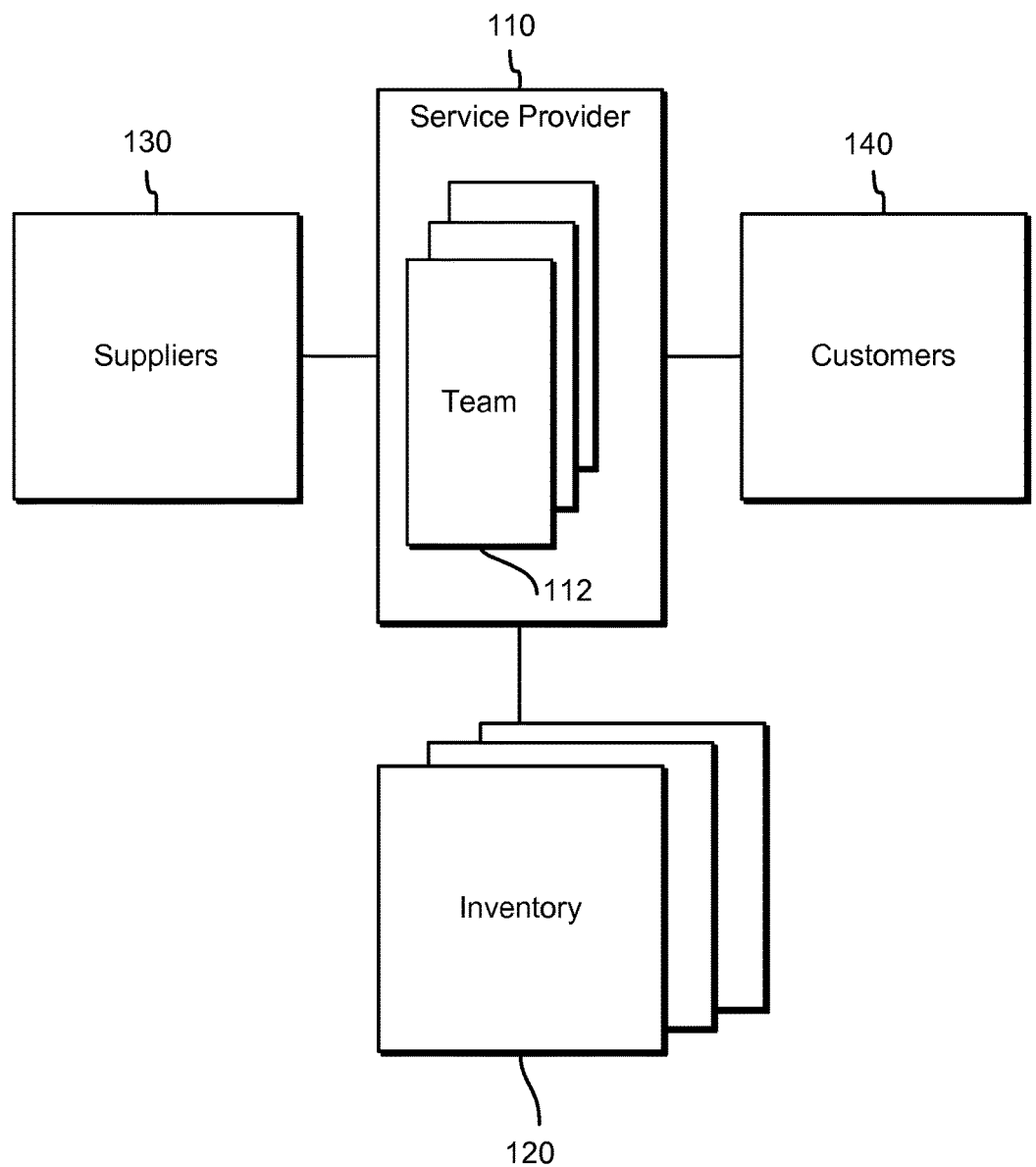
FIG. 1 is a block diagram illustrating an example environment for inventorying items at a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a forecast associated with inventorying an item. Typically, a service provider that provides a network-based resource, such as a web site for accessing an electronic marketplace, may operate various computing devices and associated services to offer items at the network-based resource. Some of the items may be obtained from sellers and/or other entities, stored as inventory, and offered to customers as in-stock items. A customer may be enticed to purchase an in-stock item because of, for example, a shorter delivery flow. However, the supply and demand may be stochastic.

To generate a forecast associated with inventorying an item during a planning horizon, supply and demand for the item during the planning horizon may be simulated. The simulations along with other data about the item may be used to generate various aspects of the forecast. For example, the forecast may include labor and/or capacity forecasts. A labor forecast may be used to plan for a labor level associated with inventorying (e.g., receiving, handling, and storing) and providing units of the item during the planning horizon. A capacity constraint may be similarly used to plan for storage capacity of an inventory system to store the units of the item during the planning horizon.

In certain situations, realizations of the supply and/or demand (e.g., actual observations of the supply and/or demand) may change relative to the simulations. Accordingly, a feedback loop may be used to monitor the realizations in real-time. If a change is detected, the forecast may be updated to optimize an optimization parameter (e.g., increase or maximize a profit given a set of constraints). For example, the labor forecast may change to increase the labor level, thereby allowing additional units of the item to be inventoried if such an increase in the labor level does not result in a cost outweighing the additional revenue.

To illustrate, consider an example of a sales and operations planning (S&OP) forecast of books (or some other items) available for ordering from an electronic marketplace. Supply and demand for the books over a fourteen week planning horizon (or some other time period) may be simulated based on historical supply and demand data. A certain quantity of the books (e.g., one thousand) may be forecasted to be gradually inventoried over the fourteen weeks. Accordingly, a certain labor level (e.g., one hundred hours) and capacity level (e.g., five hundred cubic feet) may be forecasted. While the books are inventoried and orders thereof received and processed during the planning horizon, a determination may be made in real-time that the actual demand for the book is higher than forecasted (e.g., by an additional two hundred books). A cost associated with acquiring the additional quantity (e.g., cost of the books, rushed shipping to receive this quantity at the inventory system), a cost associated with additional labor (e.g., twenty hours of overtime), and a cost associated with additional capacity (e.g., allocating an additional one hundred cubic feet in the inventory system) may be estimated. These costs may be balanced against revenue from offering the additional quantity of the books. Similar costs may also be simulated for other potential quantities (e.g., one hundred books) and/or for other allocations of labor and capacity levels and balanced against resulting revenues. The costs that may result in the maximum revenue may be selected (e.g., the ones corresponding to the twenty hours of overtime and the additional one hundred cubic feet of storage). Based on these costs, the S&OP forecast may be updated during the planning horizon. For example, the labor forecast may be increased to include the twenty hours of overtime during the planning horizon. Similarly, the capacity forecast may be increased to include the additional one hundred cubic feet of storage during the planning horizon.

In the interest of clarity of explanation, various embodiments may be described using an example S&OP forecast associated with an item available for ordering from an electronic marketplace. However, the embodiments are not limited as such. Instead, the embodiments may similarly apply to other types of forecasts, other items, and/or other network-based resources. Generally, a forecast may be associated with planning for acquiring, storing, providing, and/or returning units of an item. The forecast may be generated and updated based on various types of data including, for example, simulations associated with various parameters of the planning and real-time data associated with executing the resulting plan. Further, an item may represent a tangible item (e.g., a physical or digital product) or an intangible item (e.g., a service). A network-based resource may represent a computing resource that may be remotely accessed over a network.

Turning to FIG. 1, the figure illustrates an example environment configured to implement the above-described techniques to generate and update various forecasts. More particularly, the illustrated environment includes a service provider 110 having access to an inventory 120 of items. The service provider 110 may obtain some of the items from suppliers 130 or from other sources. The service provider 110 may store the obtained items in the inventory 120 until ordered by customers 140. The customers 140 may include recipients or end-users of the items. However, not all of the items may be inventoried. Instead, the service provider 110 may facilitate a service for the customers 140 to obtain items directly from the suppliers 130 or from other sources.

In an embodiment, the service provider 110 may operate a network-based resource (e.g., a web site) as a part of an electronic marketplace, to provide various types of services. Generally, the network-based resource may provide network pages or documents (e.g., web pages) associated with and/or describing the items offered through the marketplace ("item pages" or "item detail pages"). An item page may include information about an item, such as descriptions of the item, related offers, identifiers of suppliers of the item, and other information. Among this information, the item page may display an in-stock attribute for the item. An in-stock attribute may represent an indication that the item may be or is about to be available in the inventory 120. In comparison, if the item is not available, the item page may display an out-of-stock attribute.

The suppliers 130 may operate computing devices to access the network-based resource over a network. A supplier may represent a seller, reseller, retailer, merchant, manufacturer, vendor, and/or another entity involved in providing items. The access of a supplier may enable various types of supplier-related transactions, such as offering items, updating offers of items, requesting item returns, and/or canceling offers. In an example, the suppliers 130 and/or the service provider 110 may also use the network-based resource to offer price matching, promotions, markdowns, and/or vendor-associated list prices (e.g., changes to offered prices) for particular items.

Similarly, the customers 140 may operate computing devices to also access the network-based resource over a network. A customer may represent an end user, a consumer, a recipient of the item, and/or a potential recipient or user associated with obtaining the item. The access of a customer may enable various customer-related transactions, such as browsing, searching, purchasing, returning, and/or reviewing items. In particular, a customer may access an item page associated with an item, review the information about the item, and make a purchasing decision. As part of the purchase decision, the customer may consider the in-stock attribute. For example, the customer may be enticed to purchase the in-stock item over an out-of-stock item because of the potentially shorter delivery time.

In an embodiment, the service provider 110 may represent a plurality of teams. A team 112 may be associated with an item, a collection of items, a category of items, or a group of items. For example, the team 112 may manage a flow of the respective item(s) from the suppliers 130 to the customers 140 or vice versa. The flow may use the inventory 120. Managing the flow may include various management functions such as acquiring, storing (e.g., in the inventory 120), providing, and/or returning units of the item(s), planning for resources (e.g., labor, storage capacities, infrastructure, etc.), executing the resulting plans, monitoring the usage of the resources as the plans are executed, and/or updating the resources and plans. In an example, the team 112 may use an S&OP forecast to manage the flow. Generally, the S&OP forecast may facilitate different plans associated with the various management functions, such as sales plans, production plans, inventory plans, labor plans, capacity plans, and/or other plans. Plan frequency and planning horizon may vary by team and/or type of the respective items. A planning horizon may represent a period of time for which an S&OP forecast may be applicable to manage a flow.

In an embodiment, the inventory 120 may represent a warehouse, a fulfillment center, a data center, a content distribution center, or some other storage resource for storing items. As illustrated in FIG. 1, there may be a plurality of inventories associated with the service provider 110. Each of the inventories may be at a certain geographical location. In an example, units of an item may be inventoried in a plurality of the inventories and, as such, distributed across a plurality of geographical locations. This may allow units of the items to be provided (e.g., shipped) to customers based on locational data, thereby reducing cost (e.g., shipment cost) and shipping time. A team, such as the team 112, managing a flow of this item may be responsible to load balance the distribution of the items across the various inventories. An S&OP forecast of this team may facilitate the load balancing.

By using S&OP forecasts, managing the flows of items between the suppliers and the customers 140 through the inventory 120 (or inventories) may be facilitated. In existing techniques, a team may typically generate its own S&OP forecast. For example, the team 112 responsible for a particular item may consider data associated with this item, use a time series model to estimate various plans based on the data, and generate an S&OP forecast for a planning horizon. Upon the end of the planning horizon, a new S&OP forecast may be generated for the next planning horizon. However, such techniques may result in generating the S&OP forecast for the team 112 in isolation of the other teams. Further, the S&OP forecasts may be generated in batches (e.g., periodically based on the planning horizon) and may not be updated, continuously or otherwise, based on variability associated with the supply and demand for the item.

Instead, the embodied techniques may generate an S&OP forecast for a team in light of data associated with the team and with other teams, and may allow a continuous update of the S&OP forecast during the planning horizon based on real-time data. To do so, the embodied techniques may implement a combination of approaches. An example approach may assume that the supply and demand are random variables. Accordingly, simulations of these variables may be used to generate an S&OP forecast that may include optimal plans, such as plans that may maximize (or exceed a threshold) profits or minimize (or fall below a threshold) costs. As such, variability in the supply (e.g., supplier's lead time, item becoming unavailable, etc.) and/or in the demand (e.g., a third party promotion for the item resulting in an increased demand) may be accounted for. Another example approach may assume that the S&OP forecast for one item may impact the S&OP forecast of another item. For instance, this approach may analyze whether an optimal plan may be reached by shifting resources (e.g., labor or capacity) from one item to the other. Accordingly, data associated with both items may be used to generate the two S&OP forecasts. A further example approach may consider data across various inventories. Accordingly, the S&OP forecast of an item may facilitate load balancing the item across the inventories if the load balancing may result in the optimal plan. Yet another example approach may standardize the type of data used to generate the S&OP forecasts across the different teams. Under this approach, uniformity across the teams may be achieved. This approach may also include automating some or all of the inputs used to generate the S&OP forecasts. For instance, data available from a management system configured to manage the flow of the items (as further illustrated in FIG. 2) may be accessed and used. A further example approach may implement a feedback loop to update the S&OP forecasts on a continuous basis. For example, actual realizations of the supply and demand variables may be accessed from the management system in real-time and used to update the S&OP forecasts during the planning horizon.

Any or a combination of these example approaches may improve the quality of an S&OP forecast. In particular, the S&OP forecast may more accurately account for data, including real-time data. In turn, operations of systems using the S&OP forecast may be improved. For example, better planning and usage of resources of the service provider's 110 teams and/or of the suppliers 130 may result. Further, in certain situations where the electronic marketplace may provide a very large number of units of items (e.g., in the millions) and, accordingly, a large number of teams (e.g., in the hundreds and thousands), the standardization and uniformity of the S&OP forecasts may facilitate the scaling up (or down) of the resources, the teams, and/or the systems available to the teams.

Figure 2:
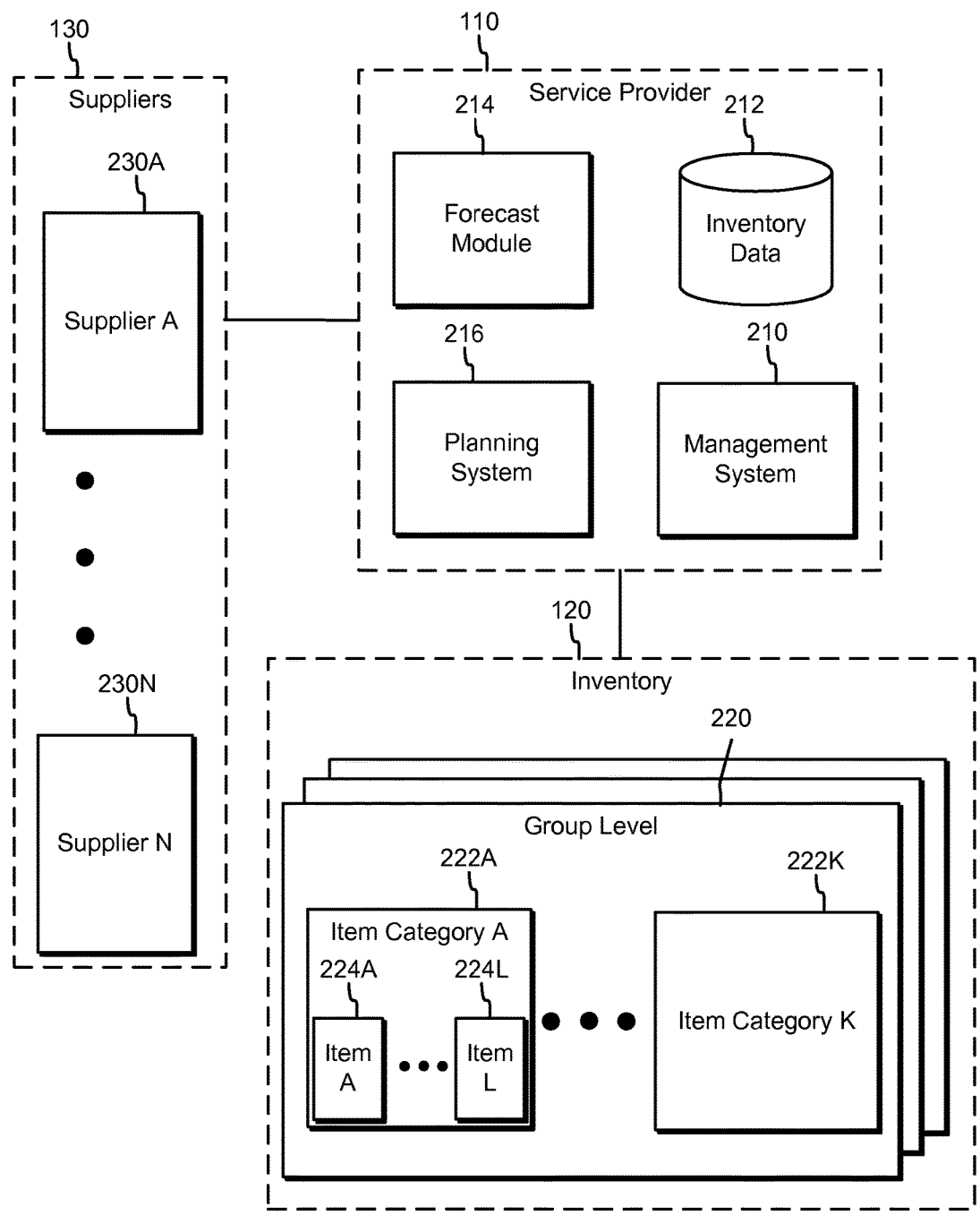
FIG. 2 is a block diagram illustrating an example forecast architecture associated with inventorying items, according to embodiments.

Turning to FIG. 2, an example of an environment that may use a combination of the above approaches is illustrated. In particular, the service provider 110 may operate a management system 210, a forecast module 214, and a planning system 216. While the planning system 216 may be configured to plan a flow of units of items from suppliers to customers (and vice versa) through an inventory, the management system 210 may be configured to facilitate execution of the flow. The forecast module 214 may be configured to generate an S&OP plan usable by the planning system 216 and to use a feedback loop with the management system 210 to continuously update the S&OP forecast based on the execution of the flow. In an embodiment, the forecast module 214 may be hosted by a computing system separate from the management system 210 and the planning system 216, may be integrated with one of the management system 210 or the planning system 216, or may be distributed between the management system 210 and the planning system 216.

The management system 210 may use inventory data 212 to execute the flow and perform various inventory-related operations. In an example, operations of the management system 210 may be implemented as a service on a computer system or the management system 210 may be specialized computing hardware configured to access, process, and output the inventory data 212. The management system 210 may be configured to acquire, store, provide, return, stock items, track which items may be in-stock, track which items may be out-of-stock, order and stock additional units of items, and/or perform other inventory-related operations. In other words, the management system 210 may represent a production system.

A database or some other storage type may store the inventory data 212. The inventory data 212 may represent data related to the inventory 120. For example, the inventory data 212 may include data related to offering, orders for, and/or returns of items. Some of the data may be stored in the database based on transactions associated with users (e.g., the service provider 110, the suppliers 130, the customers 140, or other operators). Other data may be stored in the database based on an analysis of the already-stored data. For example, the inventory data 212 may include historical and/or estimated data. The historical data may include historical realizations of different variables, such as supply, demand, lead time, labor constraints, capacity constraints, or other variables. The estimated data may include data forecasted or predicted based on the historical data or other data from the inventory data 212. For example, predictions and associated likelihoods of values (or realizations) of a demand variable may be generated based on an analysis of historical realizations of this variable. The analysis may use various techniques such as machine learning, pattern recognition, or regression models.

In addition to historical and estimated data, the inventory data 212 may also include real-time data. This type of data may be generated by the management system 210 and/or may be received from other systems associated with the service provider 110, the inventory 120, the suppliers 130, and/or the customers 140. Generally, real-time data may represent data delivered immediately after collection and may reflect up-to-date available data (e.g., the most up-to-date data or relevant fresh data). For example, the real-time data may include data related to labor allocations, data related to capacity, lead time information for receiving units of items at the inventory 120, policy information for ordering the units of the items from one or more sources (e.g., the suppliers 130), existing (e.g., the most current) inventory levels of the items, existing purchase orders of the items, shipment information for receiving the units of item at the inventory 120, and returns (e.g., scheduled) of the units of the items.

Furthermore, the inventory data 212 may be thought of as including inbound and outbound data. Inbound data may relate to items arriving to the inventory 120 for storage. Outbound data may relate to items leaving the inventory 120 to other inventories, to the customers 140, or to the suppliers 130. Generally, these two types of data may be used in conjunction or separately for different reasons. For example, an inbound cost may be computed based on some or all of the inbound data. Similarly, an outbound cost may be computed based on some or all of the outbound data. Depending on the application, a profit associated with offering one or more items from the inventory 120 (or a plurality of inventories) may be optimized (e.g., maximized) based on one or both of these costs (e.g., by reducing the inbound and/or outbound costs).

The planning system 216 may use some or all of inventory data 212 to generate plans associated with the flows of items. Some or all of the data generated by the planning system 216 may also be added to the inventory data 212. For example, the planning system 216 may be configured to simulate supply, demand, and other variables and/or generate different plans associated with the flows. The management system 210 may use the plans generated by the planning system 216 to execute the flows. In an example, operations of the planning system 216 may be implemented as a service on a computer system or the planning system 216 may be specialized computing hardware.

In comparison, the forecast module 214 may bridge the planning system 216 and the management system 210. In particular, the forecast module 214 may use some or all of the inventory data 212 (e.g., the simulations of the various variables and the real-time data) to generate S&OP forecasts associated with items for various planning horizons. Generally, the forecast module 214 may generate an S&OP forecast by searching for a forecast that may optimize a number of parameters (e.g., maximize or increase profitability and minimize or decrease cost) given potential simulations of variables and/or sets of constraints. The optimization analysis may use various techniques, such as objective functions, Monte Carlo methods, and other optimization techniques. In an example, an S&OP forecast for one item may be based on data about the item. In another example, the S&OP forecast for the item may also be based on additional data about another item. In yet another example, the S&OP forecast for the item may be based on inventory data across various inventories. These different examples may facilitate finding an optimal plan that may optimize a parameter (e.g., profit) by shifting or balancing resources across items and/or inventories.

Further, the forecast module 214 may implement a feedback loop with the management system 210. The feedback loop may facilitate monitoring of real-time data, detecting changes relative to data used to generate an S&OP forecast (e.g., a change between realizations and simulations of supply and demand), and updating the S&OP forecast as needed (e.g., if the change exceeds a threshold indicating an unacceptable change). Updating the forecast may include searching for changes to the variables and/or the constraints that may nonetheless result in an optimization of the number of optimization parameters (e.g., profitability or cost).

In an example, the feedback loop may use one or more stateless libraries. A stateless library may be configured to enable the system to use at least a portion of the real-time data to update the S&OP forecast without impacting the usage of the management system 210 of this data. For example, the stateless library may subscribe to the inventory data 212 but may not change, edit, or add to the inventory data 212. The forecast module may access or receive some of the inventory data 212 (e.g., the real-time data) via the stateless library(ies) to generate the S&OP forecasts. Once the S&OP forecasts may be generated, the planning system 216 may use these forecasts to plan the flows, in turn causing the management system 210 to execute the flows. Given the feedback loop, real-time data may be continuously monitored, the S&OP forecasts updated as needed, and updates to the plans and executions of the flows proactively performed.

In an embodiment, each of the management system 210 and the planning system 216 may integrate, interface with, or subscribe to services of the forecast module 214. Further, one or each of the management system 210 and the planning system 216 may provide interfaces to allow users (the service provider 110, operators of the inventory 120, suppliers 130, and/or customers 140) access and interaction with provided services. The interfaces may include web interfaces and/or application programming interfaces (APIs). A service may include providing S&OP forecasts and receiving various data (e.g., a supplier's lead time from the supplier).

In an embodiment, the operators of the inventory 120 may operate various computing systems to interface with the management system 210 and/or the planning system 216. The operators of the inventory 120 may be the same or a different entity than the service provider 110. In an example, some or all of the operators may represent automated processes and computing services. In particular, the operators may provide information about group levels 220, item categories 222, and items 224. An item category may represent a collection of items that may share at least one common feature. For example, digital single-lens reflex (DSLR) cameras from different manufactures may belong to a same item category of DSLR cameras. A group level may represent a group of item categories that may share at least one common feature. For example, a DSLR camera category and a digital compact camera category may belong to a same group of digital cameras. The hierarchy between items, item categories, and group levels may be repeated at multiple levels. A team of the service provider 110 or of the operators may be associated with each level and may be responsible to manage a flow of the item(s) of that level.

The provided information may include, for example, an identifier of a group level, identifiers item categories within that group level, identifiers of items within one category, and/or quantities of stored items. This information may also include observed values for various variables and constraints per group level, item category, and/or item. For example, the information may include observed supply, demand, labor, capacity, and other variable and constraint-related information. Labor-related information may include information about a labor level, such man power, head count, or hour estimates. Capacity-related information may include information about constraints, such as a receipt constraint and a storage constraint. A receipt constraint may represent available resources to receive and prepare an item for storage. A storage constraint may represent available storage space (e.g., physical storage volume such as cubic foot, data storage volume such as Gigabyte, etc.).

The suppliers 130, illustrated as suppliers 230A-N, may likewise operate computing systems to interface with the management system 210 and/or the planning system 216. As explained herein above, the interface may be facilitated via web interfaces and/or APIs such that the suppliers may subscribe to services of the management system 210 and/or the planning system 216. Each of the suppliers 230A-N may provide items of a same item category or of different item categories. Further, each of the suppliers 230A-N may be associated with a supplier offer and a supplier constraint. A supplier offer may represent an offer for an item including, for example, a cost, a price, a promotion, a markdown, and/or a price match option. A supplier constraint may represent a capacity of a supplier to provide an item (or certain quantity of the item) within a certain time period or across a plurality of time periods. For example, a supplier constraint may account for a lead time to manufacture and deliver an item. By utilizing the interfaces, the suppliers 230A-N may input information associated with the various items including the supplier offers and constraints. In turn, this information may be stored as part of the inventory data 212.

Hence, by implementing the management system 210, the forecast module 214, and the planning system 216, the service provider 110 may improve a quality of S&OP forecasts. The improved quality may, in turn, improve plans of the planning system 216 and executions of the plans by the management system 210 across the inventories of the service provider 110. By also providing interfaces to various operators and to the suppliers 130, operations of the respective underlying systems of the operators and the suppliers 130 may be similarly improved.

Figure 3:
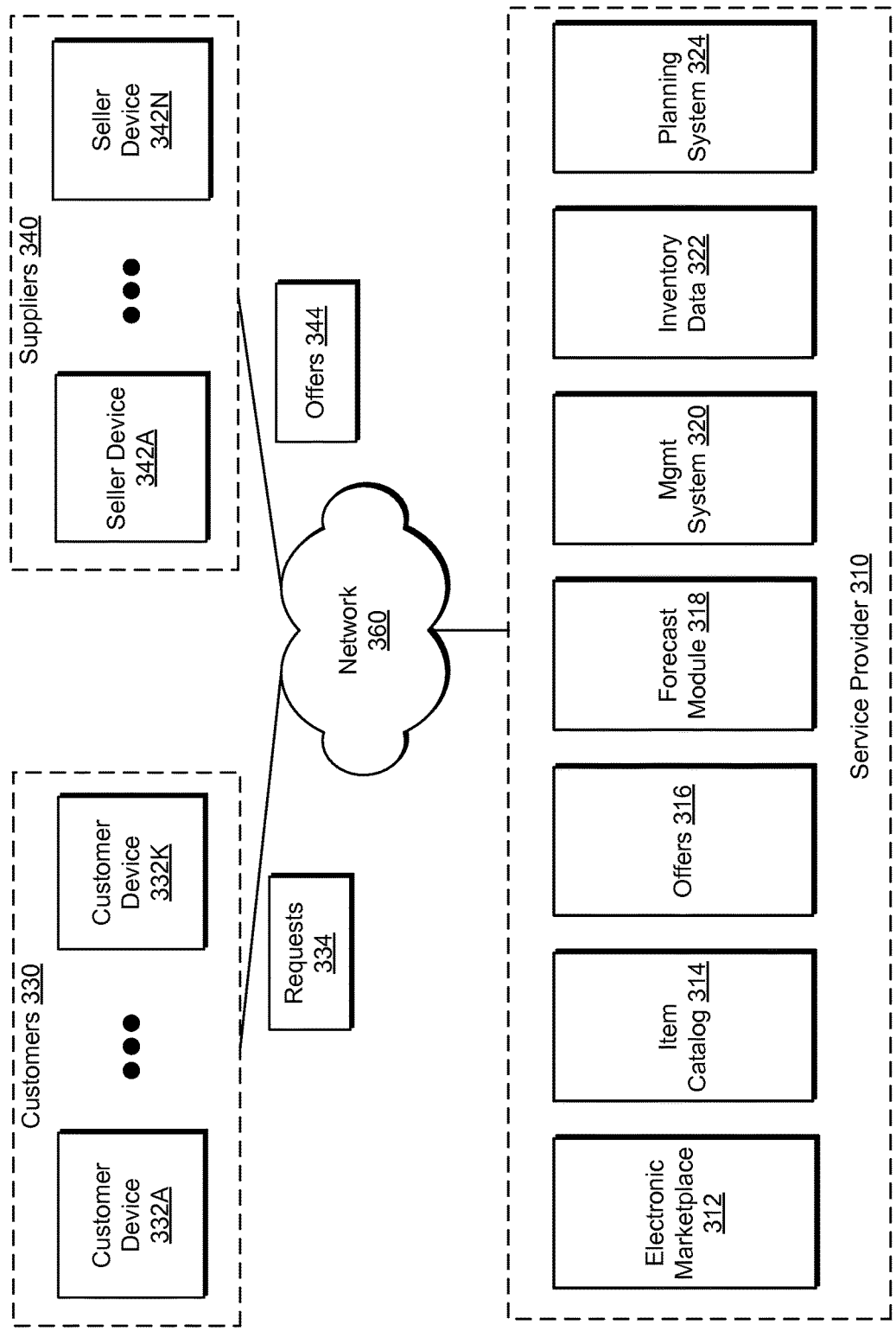
FIG. 3 illustrates an example computing environment associated with an electronic marketplace, according to embodiments.

A forecast module, such as the forecast module 214, may be implemented within a context of an electronic marketplace. In particular, the forecast module may generate and update forecasts of various items available for ordering from the electronic marketplace. FIG. 3 illustrates an example computing environment for implementing such a module in the context of an electronic marketplace. In particular, a service provider 310 of an electronic marketplace 312 may implement a forecast module 318 on a service provider computing resource to generate S&OP forecasts associated with inventorying purposes.

The electronic marketplace 312 may offer different items. Offered items may be cataloged in an item catalog 314. In addition, the offered items may be ordered from the electronic marketplace 312 according to offers 316. The offers 316 may use data from the item catalog 314 to describe some of the item attributes and offer attributes.

A network-based document (e.g., a web page) of the electronic marketplace 312 may be associated with an item. For example, the network-based resource document may allow suppliers 340 and/or the service provider 310 to provide information for ordering an item. This may include the suppliers listing offers 344 at the electronic marketplace 312. The network-based document may also allow customers 330 to review this information and make an order or purchase decision. The customers 330 may, for example submit requests 334 for offers. In an example, the network-based resource document may present information from the item catalog 314 for the offers 316.

The forecast module 318 may be configured to generate S&OP forecasts that may optimize a number of parameters, such as profitability and cost, given various variables and constraints. The forecast module 318 may interface or integrate with a planning system 324 to determine data associated with the variable and the constraints. The forecast module 318 may also interface or integrate with a management system 320 to determine real-time data and update the S&OP. Some or all of the data may be stored in, and accordingly, determined from inventory data 322. The forecast module 318 may use the inventory data 322 to generate and update the S&OP forecasts.

As such, the service provider 310 may operate the electronic marketplace 312 to facilitate interactions between the service provider 310, the customers 330, and the suppliers 340 over a network 360. Each one of the suppliers 340 may operate one or more supplier devices 342A-N to access the electronic marketplace 312 and perform various supplier-related transactions. A customer may be an item recipient, a buyer, or any user reviewing, browsing, ordering, obtaining, purchasing, or returning an item of a supplier. Each one of the customers 330 may operate one or more customer devices 332A-K to access the electronic marketplace 312 and perform various customer-related transactions.

Figure 4:
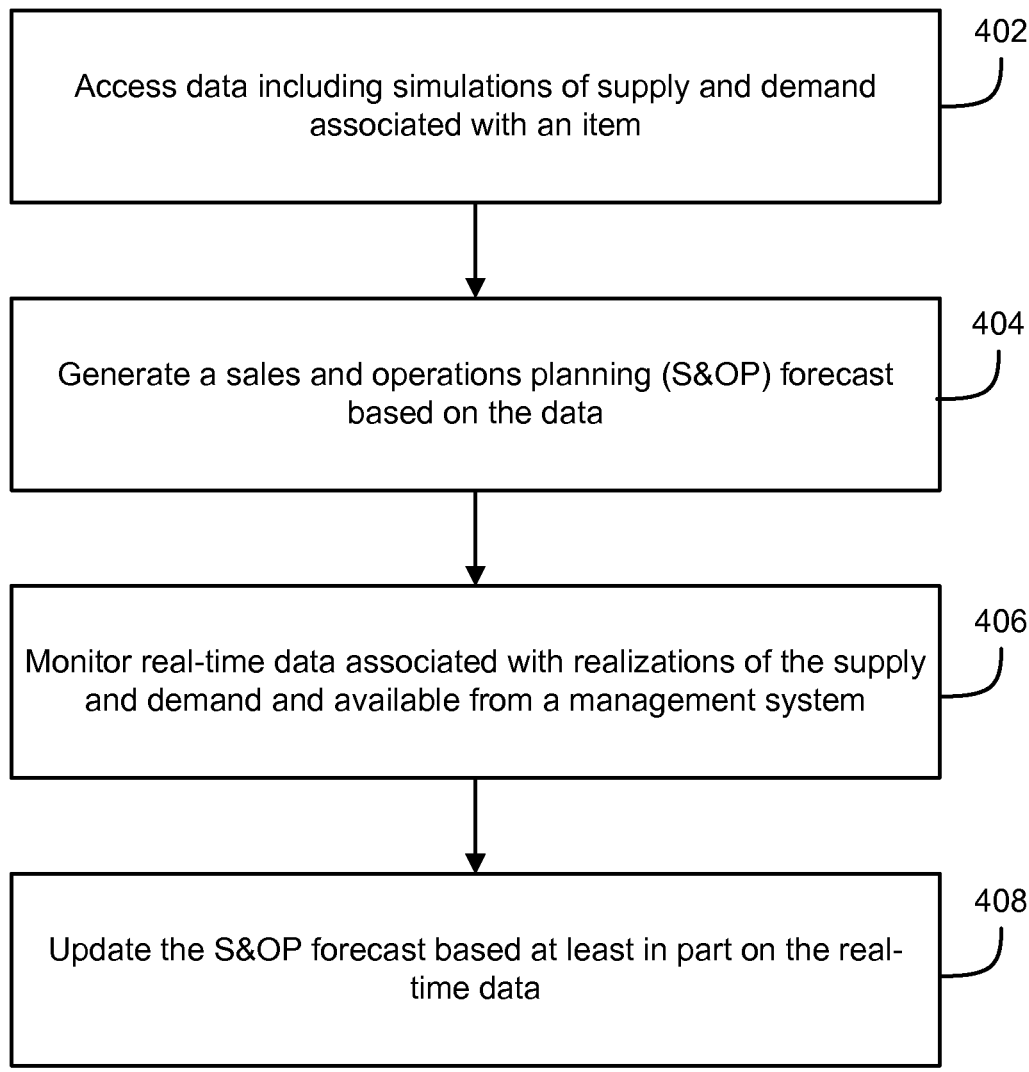
FIG. 4 is a block diagram illustrating an example flow for generating a forecast associated with an item, according to embodiments.
Figure 5:
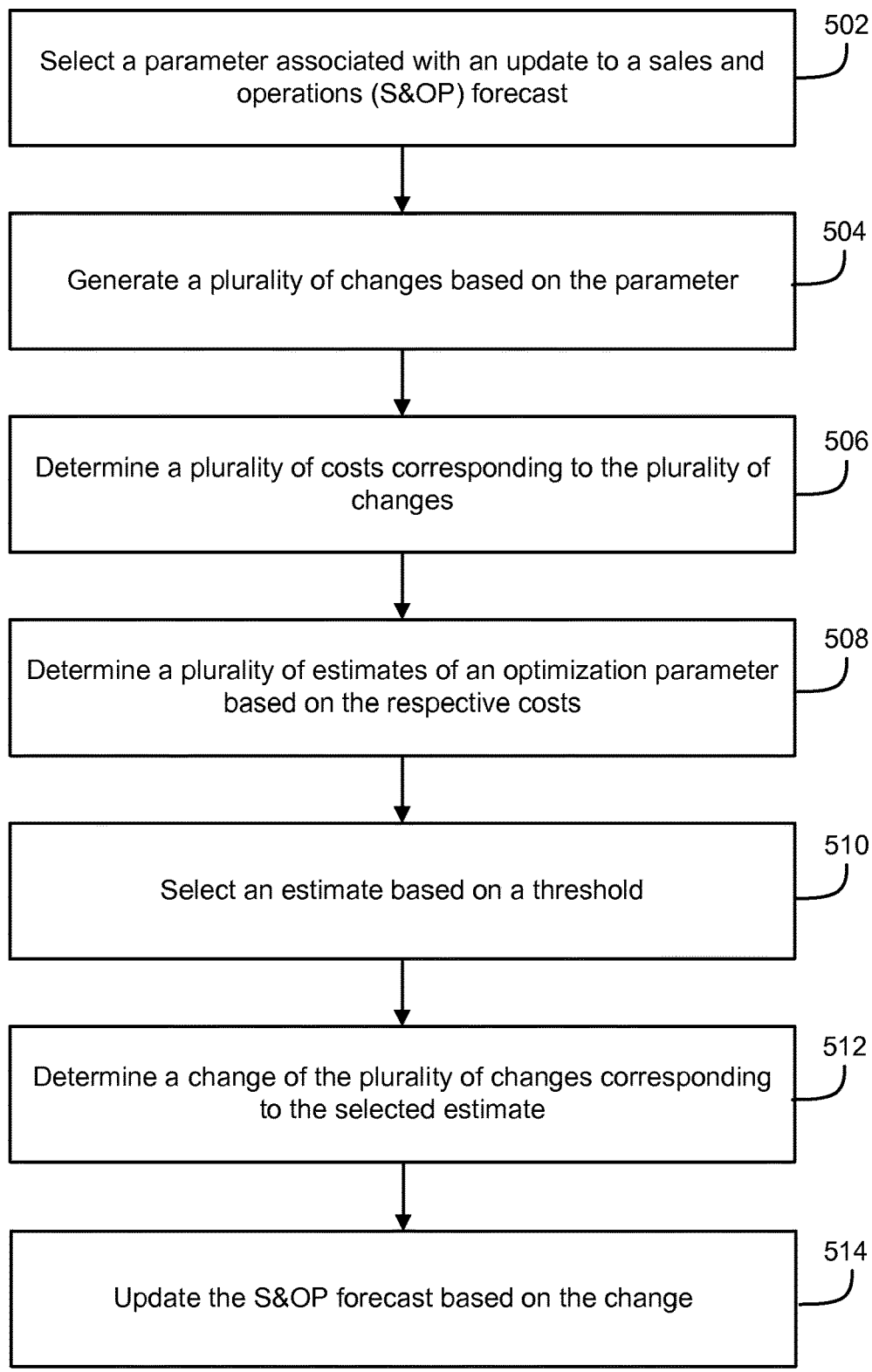
FIG. 5 is a block diagram illustrating an example flow for updating a forecast associated with an item, according to embodiments.

Turning to FIGS. 4-5, the figures illustrate example flows related to providing an S&OP forecast associated with an item. In particular, FIG. 4 illustrates an example flow for generating the S&OP forecast. In comparison, FIG. 5 illustrates an example flow for updating the S&OP forecast. Some operations across the example flows may be similar. Such similarities are not repeated herein in the interest of clarity of explanation.

In the illustrative operations, some of the operations or functions may be embodied in, and fully or partially automated by, modules executed by one or more processors. For example, a forecast module hosted on a computing resource of a service provider (e.g., the forecast module 214 of FIG. 2) may be configured to perform some of the operations. Nevertheless, other, or a combination of other, computing resources, systems, and/or modules, such as a planning system or a management system, may be additionally or alternatively used. Also, while the operations are illustrated in a particular order, it should be understood that no particular order is necessary and that one or more operations may be omitted, skipped, and/or reordered.

In the interest of clarity of explanation, the example flows of FIGS. 4-5 illustrate the S&OP forecast as associated with a single item. Nevertheless, the embodiments described herein are not limited as such. Instead, the example flows may similarly apply to an S&OP forecast associated with multiple items, such as a group of items, and to a plurality of S&OP forecasts associated with a plurality of items or groups of items Turning to FIG. 4, the illustrated example flow may start at operation 402, where data associated with an item may be accessed. For example, the forecast module may access the data from an inventory data, such as the inventory data 212 of FIG. 2. In another example, the forecast module may receive the data from systems of different entities of the service provider and/or suppliers. The data may include various types of data. For example, the data may include simulations of supply and demand variables of the item over a planning horizon. A simulation may represent potential realizations of a variable over the planning horizon and respective likelihoods. A cumulative distribution function may be used to express a simulation. The data may also include other variables and constraints, simulated, estimated, or otherwise such as data about existing labor levels, existing capacity levels, lead time for receiving units of the item at an inventory of the service provider, policy information for ordering the units of the item from one or more sources, an existing inventory level of the item, existing purchase orders of the item, shipment information for receiving the units of item at the inventory, and returns of the units of the item. Some of this data may represent real-time data available from a management system of the service provider, such as the management system 210 of FIG. 2. In addition to data associated with the item, similar types of data may be accessed for other items (e.g., items in a same category as the item or other types of items) and/or for more than one inventory (e.g., multiple facilities or locations).

At operation 404, the S&OP forecast may be generated based on the data. For example, the forecast module may consider one or more optimization parameters and use the data to search for a forecast that may optimize this parameter. An optimization parameter may include any or a combination of profitability per the item, per a group of items, per an inventory, and/or per a group of inventories. Optimizing profitability may include maximizing or increasing the profitability to exceed a predefined threshold. Other optimization parameters may be used, such as inbound and/or outbound costs. In this case, the optimization may include minimizing or decreasing a cost to fall below a predefined threshold.

In an example, searching for the forecast that may optimize the optimization parameter(s) may be implemented as solution to an optimization problem. Generally, the forecast module may be configured to select the best elements with regard to the optimization parameter(s) from the accessed data (e.g., from the various simulations, constraints, etc.). These best elements may become part of the optimal forecast (e.g., the generated S&OP forecast). For instance, if particular labor and capacity levels (along with other elements) may optimize profitability, the S&OP forecast may include a labor forecast and a capacity forecast reflecting these levels. The forecast module may implement various techniques to solve the optimization problem. Examples of such techniques may include an objective function and/or a Monte Carlo method.

At operation 406, real-time data may be monitored during the planning horizon. For example, the forecast module may monitor real-time data of the management system through a feedback loop using one or more stateless libraries. The real-time data may include realizations of various variables such as the supply and demand variables. Further, various types of monitoring may be implemented. For example, the monitoring may be continuous. In another example, the forecast module may access the real-time data (e.g., pull the real-time data, or receive the real-time data via a push) at time intervals, periodic or otherwise.

At operation 408, the S&OP forecast may be updated during the planning horizon based on the real-time data. In an example, the update may be continuous, such that the forecast module may continuously change the S&OP forecast. In another example, the update may be triggered during the planning horizon. For instance, the forecast module may compare portions of the real-time data to the data used in generating the S&OP forecast (e.g., by comparing the simulations and the realizations of the supply and/or demand variables). If a change exceeding a predefined threshold is detected, the forecast module may perform the update during the planning horizon. For instance, if the actual demand was larger or the actual supply was smaller than what may have been planned for, that change may trigger the update during the planning horizon.

Various techniques may be used to update the S&OP forecast. In an example technique, the forecast module may generate a new S&OP forecast based on the current real-time data, similarly to operation 404. For instance, the various variables may be re-simulated and the current constraints may be determined to generate the new S&OP plan. In another example technique, changes to the S&OP forecast may be used. For instance, various changes may be generated (e.g., changes to the labor forecast and/or capacity forecast may be simulated) and searched to optimize the optimization parameter(s) (e.g., to select the best changes to the S&OP forecast that may optimize this parameter given the current real-time data). A Monte Carlo method, or other optimization techniques, may be used to search for the best changes. FIG. 5 further illustrates this example technique.

Once the S&OP forecast is generated and/or updated, as at operation 404 and operation 408 respectively, the forecast may be accessible to the team responsible for the flow of the item. As such, this team may receive in real-time the latest relevant S&OP forecast.

Turning to FIG. 5, the figure illustrates an example flow for updating an S&OP forecast based on real-time data. Generally, the forecast module may generate different potential changes to the S&OP forecasts and search for a particular change (e.g., a best change in terms of solving an optimization problem) that may optimize one or more optimization parameters given the real-time data. To search for the best change, the forecast module may allocate costs to the different potential changes and use these costs to optimize the optimization parameter(s). The forecast module may update the S&OP forecast based on the best change.

In particular, the example flow of FIG. 5 may start at operation 502, where a parameter associated with the update to the S&OP forecast may be selected. The parameter may set a scope of the update to the S&OP forecast. For example, the parameter may include an identifier of the item, and accordingly, limit the update to changing the S&OP forecast of the item only. In another example, the parameter may include an identifier of another item (or a number of other items). Accordingly, updating the S&OP forecast of the item may also include updating an S&OP forecast of the other item(s). In this example, the cross-item updates may allow resources (e.g., labor levels, capacity levels, units of items to be inventoried, etc.) to be shifted between the items. As such, updating the S&OP forecast of the item may consider, for instance, whether profitability may be increased by also updating the S&OP forecast of the other item(s). In yet another example, the parameter may include identifiers of more than one inventory, e.g., multiple facilities or locations. Accordingly, updating the S&OP forecast of the item (and, optionally, S&OP forecasts of other items) may balance resources between different inventories. As such, updating the S&OP forecast of the item may consider, for instance, whether profitability may be increased by load balancing across the inventories.

At operation 504, a plurality of changes may be generated based on the selected parameter. A change may represent a change to an element of the S&OP forecast, such as a change to a labor forecast, a capacity forecast, or other S&OP elements. If the parameter limits the change to the item, only elements of the S&OP forecast of the item may be generated. On the other hand, if the parameter includes other items and/or inventories, corresponding elements may also be generated.

The generated changes may represent simulations of potential acceptable changes. For example, a change to a labor forecast may be bounded by a certain range of manpower. Similarly, a change to a capacity forecast may be bounded by certain range of storage space. Generally, the range may depend on the planning horizon. The longer the planning horizon, the larger the range may be. To illustrate, if the planning horizon is fourteen weeks, a range for a storage capacity may correspond to an existing storage space of the inventory. In comparison, if the planning horizon is six months, the range may be increased to include additional storage space that may be built during that longer time period.

At operation 506, a plurality of costs corresponding to the plurality of changes may be determined. For example, each change may be allocated a predefined cost. A cost may represent a penalizing value for implementing the change. As such, increasing a labor forecast by a certain level may be allocated a value (e.g., two dollars per hour), whereas decreasing the labor forecast by the certain level may be allocated a same or a different value (e.g., one dollar per hour). Similar types of costs may be allocated to the other changes, such as changes to the capacity forecast, and/or to other S&OP elements. Thus, sets of generated changes to the S&OP forecast of the item (and, optionally, of other items) may be considered. Respective costs across a set may be summed to compute a total cost for that set.

At operation 508, a plurality of estimates of an optimization parameter may be determined based on the respective costs. An optimization parameter may include profitability, inbound cost, and/or outbound cost per item, a group of items, inventory, or a group of inventories. For each of the sets of generated changes, a value of that optimization parameter may be computed. For instance, given a labor level and a capacity level (in addition to other elements of the S&OP forecast), a profit from inventorying units of the item (or items) may be computed given the total cost of these levels.

At operation 510, an estimate of the plurality of estimates may be selected based on a threshold. This selection may include finding the optimum value of the optimization parameter given the different sets of changes to the S&OP forecast(s). For example, the maximum profitability (or some other profitability exceeding the threshold), or the minimum inbound and/or outbound costs (or some inbound and/or outbound costs falling below the threshold) may be selected.

At operation 512, a change of the plurality of changes corresponding to the selected estimate may be determined. In other words, the change that may have led to the selected estimate may be, in turn, selected from the different sets of changes. This change to the S&OP forecast (e.g., to the labor and/or capacity forecasts) may represent the best change (in terms of solving an optimization problem) with regard to the optimization parameter from the different sets of changes. In other words, the change may optimize the optimization parameter (e.g., maximize profitability or minimize inbound and/or outbound costs).

At operation 514, the S&OP forecast may be updated based on the change during the planning horizon. For example, if the change indicates a modification to a labor level, a capacity level, and/or other elements of the S&OP forecast, the labor forecast, the capacity forecast, and/or the other forecasted element may be accordingly modified. Further, based on the selected parameter of operation 502, the modification may be implemented across the S&OP forecast for the element, S&OP forecasts of a plurality of elements, and/or for load balancing across a number of inventories.

Figure 6:
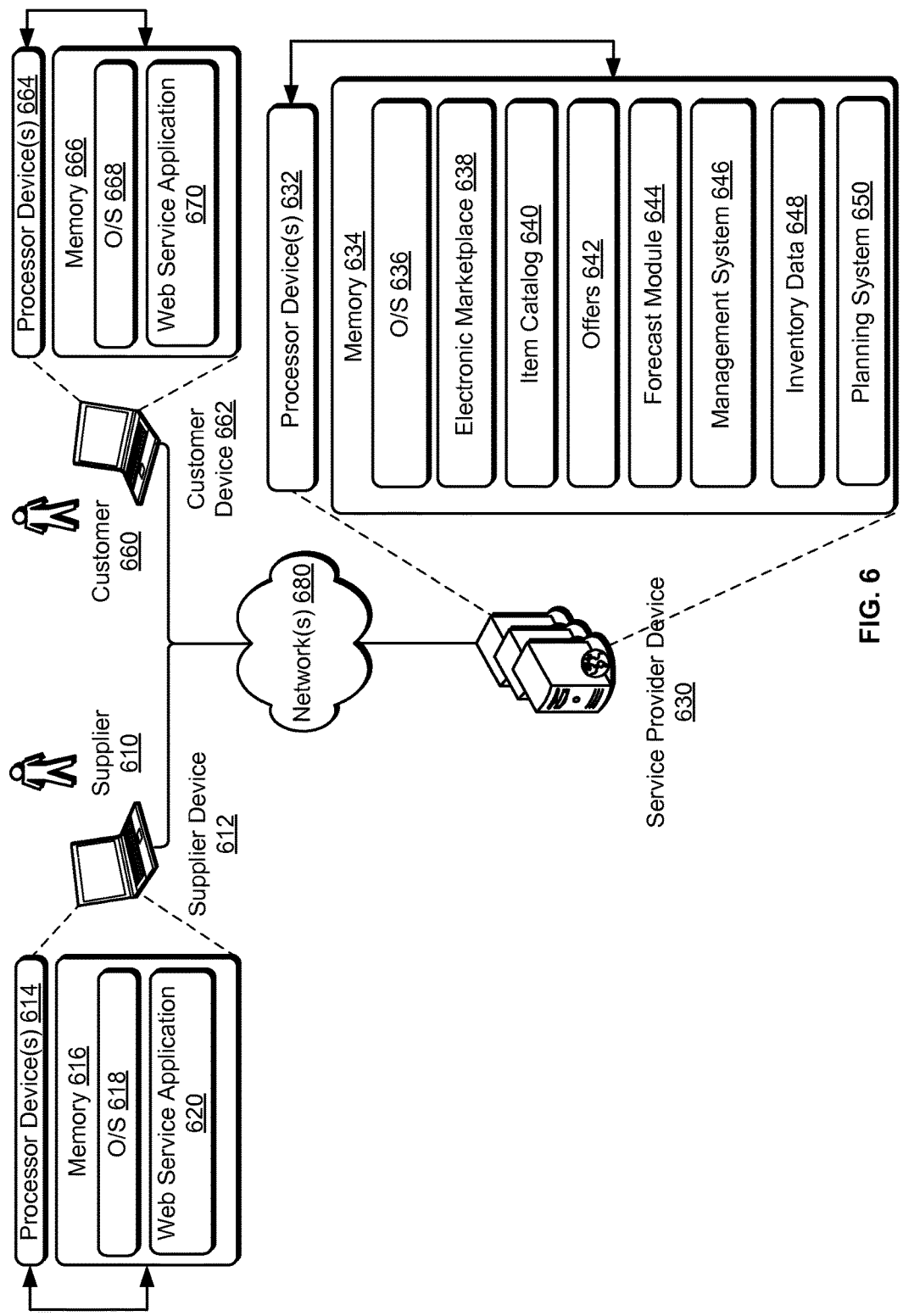
FIG. 6 illustrates an example architecture for providing a network-based resource, including at least one user device and/or one or more service provider devices connected via one or more networks, according to embodiments.

Turning to FIG. 6, that figure illustrates an example end-to-end computing environment for implementing a forecast module. In this example, a service provider may implement a forecast module, such as the forecast module 318 of FIG. 3, within the context of, for example, an electronic marketplace available to users, such as to the customers 330 and the suppliers 340 of FIG. 3.

In a basic configuration, a supplier 610 may utilize a supplier device 612 to access local applications, a web service application 620, a supplier account accessible through the web service application 620, a web site or any other network-based resources via one or more networks 680. In some aspects, the web service application 620, the web site, and/or the supplier account may be hosted, managed, and/or otherwise provided by one or more computing resources of the service provider, such as by utilizing one or more service provider devices 630. The supplier 610 may use the local applications and/or the web service application 620 to interact with the network-based resources of the service provider and perform supplier-related transactions. These transactions may include, for example, offering items for sale and/or providing information about supplier-related variables and constraints.

In some examples, the supplier device 612 may be any type of computing devices such as, but not limited to, a mobile phone, a smart phone, a personal digital assistant (PDA), a laptop computer, a thin-client device, a tablet PC, etc. In one illustrative configuration, the supplier device 612 may contain communications connection(s) that allow the supplier device 612 to communicate with a stored database, another computing device or server, supplier terminals, and/or other devices on the networks 680. The supplier device 612 may also include input/output (I/O) device(s) and/or ports, such as for enabling connection with a keyboard, a mouse, a pen, a voice input device, a touch input device, a display, speakers, a printer, etc.

The supplier device 612 may also include at least one or more processing units (or processor device(s)) 614 and one memory 616. The processor device(s) 614 may be implemented as appropriate in hardware, computer-executable instructions, firmware, or combinations thereof. Computer-executable instructions or firmware implementations of the processor device(s) 614 may include computer-executable or machine-executable instructions written in any suitable programming language to perform the various functions described.

The memory 616 may store program instructions that are loadable and executable on the processor device(s) 614, as well as data generated during the execution of these programs. Depending on the configuration and type of supplier device 612, the memory 616 may be volatile (such as random access memory (RAM)) and/or non-volatile (such as read-only memory (ROM), flash memory, etc.). The supplier device 612 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 616 may include multiple different types of memory, such as static random access memory (SRAM), dynamic random access memory (DRAM), or ROM.

Turning to the contents of the memory 616 in more detail, the memory may include an operating system (O/S) 618 and the one or more application programs or services for implementing the features disclosed herein including the web service application 620. In some examples, the supplier device 612 may be in communication with the service provider devices 630 via the networks 680, or via other network connections. The networks 680 may include any one or a combination of many different types of networks, such as cable networks, the Internet, wireless networks, cellular networks, and other private and/or public networks. While the illustrated example represents the supplier 610 accessing the web service application 620 over the networks 680, the described techniques may equally apply in instances where the supplier 610 interacts with the service provider devices 630 via the supplier device 612 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 660 may utilize customer device 662 to access local applications, a web service application 670, a customer account accessible through the web service application 670, a web site, or any other network-based resources via the networks 680. In some aspects, the web service application 670, the web site, and/or the user account may be hosted, managed, and/or otherwise provided by the service provider devices 630 and may be similar to the web service application 620, the web site accessed by the computing device 612, and/or the supplier account, respectively.

The customer 660 may use the local applications and/or the web service application 670 to conduct transactions with the network-based resources of the service provider. These transactions may include, for example, searching for items offered by the supplier 610 at the network-based resources, receiving offers for the items, ordering items, returning items, and other transactions.

In some examples, the customer device 662 may be configured similarly to the supplier device 612 and may include at least one or more processing units (or processor device(s)) 664 and one memory 666. The processor device(s) 664 may be implemented as appropriate in hardware, computer-executable instructions, firmware, or combinations thereof similarly to the processor device(s) 614. Likewise, the memory 666 may also be configured similarly to the memory 616 and may store program instructions that are loadable and executable on the processor device(s) 664, as well as data generated during the execution of these programs. For example, the memory 666 may include an operating system (O/S) 668 and the one or more application programs or services for implementing the features disclosed herein including the web service application 670.

As described briefly above, the web service applications 620 and 670 may allow the supplier 610 and customer 660, respectively, to interact with the service provider devices 630 to conduct transactions involving items. The service provider devices 630, perhaps arranged in a cluster of servers or as a server farm, may host the web service applications 620 and 670. These servers may be configured to host a web site (or combination of web sites) viewable via the computing devices 612 and 662. Other server architectures may also be used to host the web service applications 620 and 670. The web service applications 620 and 670 may be capable of handling requests from many suppliers 610 and customers 660, respectively, and serving, in response, various interfaces that may be rendered at the computing devices 612 and 662 such as, but not limited to, a web site. The web service applications 620 and 670 may interact with any type of web site that supports interaction, including social networking sites, electronic retailers, informational sites, blog sites, search engine sites, news and entertainment sites, and so forth. As discussed above, the described techniques may similarly be implemented outside of the web service applications 620 and 670, such as with other applications running on the computing devices 612 and 662, respectively.

The service provider devices 630 may, in some examples, provide network-based resources such as, but not limited to, applications for purchase and/or download, web sites, web hosting, client entities, data storage, data access, management, virtualization, etc. The service provider devices 630 may also be operable to provide web hosting, computer application development, and/or implementation platforms, or combinations of the foregoing to the supplier 610 and customer 660.

The service provider devices 630 may be any type of computing device such as, but not limited to, a mobile phone, a smart phone, a personal digital assistant (PDA), a laptop computer, a desktop computer, a server computer, a thin-client device, a tablet PC, etc. The service provider devices 630 may also contain communications connection(s) that allow service provider devices 630 to communicate with a stored database, other computing devices or servers, supplier terminals, and/or other devices on the network 680. The service provider devices 630 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 630 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 630 may be in communication with the computing devices 612 and 662 via the networks 680, or via other network connections. The service provider devices 630 may include one or more servers, perhaps arranged in a cluster, or as individual servers not associated with one another.

In one illustrative configuration, the service provider devices 630 may include at least one or more processing units (or processor devices(s)) 632 and one memory 634. The processor device(s) 632 may be implemented as appropriate in hardware, computer-executable instructions, firmware, or combinations thereof. Computer-executable instruction or firmware implementations of the processor device(s) 632 may include computer-executable or machine-executable instructions written in any suitable programming language to perform the various functions described.

The memory 634 may store program instructions that are loadable and executable on the processor device(s) 632, as well as data generated during the execution of these programs. Depending on the configuration and type of the service provider devices 630, the memory 634 may be volatile (such as random access memory (RAM)) and/or non-volatile (such as read-only memory (ROM), flash memory, etc.). The service provider devices 630 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 634 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 634 in more detail, the memory may include an operating system (O/S) 636, code for an electronic marketplace 638, data related to an item catalog 640, data related to available offers 642, code for a forecast module 644, code for a management system 646, inventory data 648, and code for a planning system 650. Although FIG. 6 illustrates the various data as stored in the memory 634, this data or portion of the data may be additionally or alternatively stored at a storage device remotely accessible to the service provider devices 630.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   hosting, by a computer system, a forecast module, the computer system interfacing with a planning system, a management system, a data store, and a computing resource that is associated with an operator of an inventory of an electronic marketplace, wherein:
   the planning system is configured to plan a flow of units of items through the inventory by at least generating simulations of supply and demand for the items during a planning horizon, and a labor forecast and a capacity forecast associated with inventorying the units of the items during the planning the planning horizon,
   the management system is configured to manage the flow based at least in part on a sales and operations planning (S&OP) forecast that is associated with an item of the items and that is generated by the forecast module,
   the data store stores the simulations, the labor forecast, and the capacity forecast, and
   entries in the data store are updated based at least in part on input of the operator at the computing resource, the input indicating realizations of the supply, the demand, the labor forecast, and the capacity forecast;
   accessing, by the forecast module from the data store, data associated with the item, the data comprising the simulations, the labor forecast, and the capacity forecast;
   generating, by the forecast module, the S&OP forecast based at least in part on the data, the S&OP forecast generated by at least using the simulations, the labor forecast, and the capacity forecast as variables and searching for a labor level and a capacity level from the variables according to an optimization parameter;
   outputting, by the forecast module, the S&OP forecast to the management system;
   monitoring, by the forecast module, real-time data associated with orders for the item and with the realizations of the labor forecast and the capacity forecast during the planning horizon, the real-time data available from the data store and generated by the management system, the real-time data monitored based at least in part on a feedback loop that is between the forecast module and the management system and that uses a stateless library to input the real-time data from the data store to the forecast module;
   updating, by the forecast module, the S&OP forecast during the planning horizon based at least in part on the real-time data to generate an updated S&OP forecast, wherein updating the S&OP forecast comprises balancing an allocation of units of the item to the inventory with an allocation of other units of items to another inventory of the electronic marketplace; and
   outputting, by the forecast module, the updated S&OP forecast to the management system.

2. The computer-implemented method of claim 1, wherein updating the S&OP forecast comprises changing the labor forecast by at least:
   generating a plurality of changes to the labor forecast;
   estimating a plurality of costs corresponding to the plurality of changes;
   determining a cost of the plurality of costs that maximizes profitability; and
   changing the labor forecast based at least in part on a change corresponding to the cost from the plurality of changes that maximizes the profitability.

3. The computer-implemented method of claim 1, wherein the S&OP forecast for the item is generated based at least in part on additional data associated with a plurality of items available for ordering from the electronic marketplace, wherein at least a portion of the additional data is available from the management system.

4. One or more non-transitory computer-readable media comprising instructions that, when executed with one or more processors of a system interfacing with a planning system, a management system, a data store, and a computing resource of an operator of an inventory, cause the system to at least:
generate a forecast for an item by at least using, as variables, simulations of supply and demand associated with the item over a planning horizon, and a labor forecast and a capacity forecast associated with inventorying items in an inventory during the planning horizon, and searching for a labor level and capacity level from the variables according to an optimization parameter;
monitor real-time data associated with realizations of the supply and demand variables during the planning horizon, at least a portion of the real-time data available from the management system configured to manage orders for units of the item from the inventory, the real-time data monitored based at least in part on a feedback loop that is between the system and the management system and that uses a stateless library to input the real-time data to the system; and
update the forecast during the planning horizon based at least in part on the real-time data, the update comprising changing the at least one of: the labor forecast or the capacity forecast, wherein updating the forecast during the planning horizon comprises balancing an allocation of the units of the item to the inventory with an allocation of other units of items to another inventory.

5. The one or more non-transitory computer-readable media of claim 4, wherein the forecast represents a sales and operations planning (S&OP) forecast.

6. The one or more non-transitory computer-readable media of claim 4, wherein the item is available for ordering from an electronic marketplace, and wherein the electronic marketplace is configured to offer the item as available from the inventory based at least in part on the management system.

7. The one or more non-transitory computer-readable media of claim 4, wherein the forecast is further generated based at least in part on one or more of: lead time information for receiving the units of the item at the inventory, policy information for ordering the units of the item from one or more sources, an existing inventory level of the item, existing purchase orders of the item, shipment information for receiving the units of the item at the inventory, and returns of the units of the item.

8. The one or more non-transitory computer-readable media of claim 4, wherein updating the forecast comprises reducing at least one of: an inbound cost or an outbound cost based at least in part on the at least one of: the labor forecast or the capacity forecast, wherein the inbound cost is associated with a cost of receiving the units of the item at the inventory, and wherein the outbound cost is associated with a cost of the units of the item leaving the inventory.

9. The one or more non-transitory computer-readable media of claim 4, wherein changing the at least one of: the labor forecast or the capacity forecast comprises:
generating a plurality of changes to the at least one of: the labor forecast or the capacity forecast;
determining a plurality of costs corresponding to the plurality of changes;
determining a plurality of profitability estimates associated with inventorying the item based at least in part on the plurality of respective costs;
selecting a profitability estimate that exceeds a threshold, the profitability estimate selected from the plurality of profitability estimates;
determining a change of the plurality of changes corresponding to the profitability estimate that exceeds the threshold; and
changing the at least one of: the labor forecast or the capacity forecast based at least in part on the change of the plurality of changes.

10. The one or more non-transitory computer-readable media of claim 4, wherein changing the at least one of: the labor forecast or the capacity forecast comprises allocating a set of the units of item for inventorying at the another inventory.

11. The one or more non-transitory computer-readable media of claim 4, wherein monitoring real-time data comprises detecting that a change between the realizations and the simulations of the supply and demand variables exceeds a threshold, and wherein the change exceeding the threshold causes the forecast to be updated.

12. A system comprising:
one or more processors; and
one or more computer-readable media comprising instructions that, when executed with the one or more processors, cause the system to at least:
simulate supply and demand associated with an item during a planning horizon;
generate a forecast associated with inventorying units of the item in an inventory during the planning horizon by at least using, as variable, the supply and demand, and a labor forecast and a capacity forecast associated with inventorying items in the inventory during the planning the planning horizon, and searching for a labor level and capacity level from the variables according to an optimization parameter;
monitor real-time data associated with realizations of the supply and demand during the planning horizon, at least a portion of the real-time data available from a management system configured to manage orders for the units of the item from the inventory, the real-time data monitored based at least in part on a feedback loop that is between the system and the management system and that uses a stateless library to input the real-time data to the system; and
update the forecast during the planning horizon based at least in part on the real-time data, the updating comprising changing the at least one of: the labor forecast or the capacity forecast, wherein updating the forecast during the planning horizon comprises balancing an allocation of the units of the item to the inventory with an allocation of other units of items to another inventory.

13. The system of claim 12, wherein the forecast is further generated based at least in part on simulations of supply and demand associated with an other item to be inventoried in the inventory.

14. The system of claim 13, wherein the other item is associated with an other forecast, wherein the forecast and the other forecast are generated based at least in part on a same type of data available from the management system.

15. The system of claim 13, wherein the other item is associated with an other forecast, wherein updating the forecast causes an update to the other forecast.

16. The system of claim 12, wherein changing the at least one of: the labor forecast or the capacity forecast comprises:
generating a plurality of updates to the at least one of: the labor forecast or the capacity forecast;
determining a plurality of changes to an other forecast of an other item to be inventoried in the inventory, the plurality of changes corresponding to the plurality of updates;
determining a plurality of profitability estimates associated with inventorying the item and the other item based at least in part on the plurality of respective changes and updates;
selecting a profitability estimate that exceeds a threshold, the profitability estimate selected from the plurality of profitability estimates;
determining an update of the plurality of updates corresponding to the profitability estimate; and
updating the at least one of: the labor forecast or the capacity forecast based at least in part on the update corresponding to the profitability estimate.

17. The system of claim 12, wherein the at least a portion of the real-time data is available from the management system based at least in part on using one or more stateless libraries.

18. The system of claim 17, wherein the one or more stateless libraries are configured to enable the system to use the at least a portion of the real-time data for updating the forecast without impacting a usage by the management system of the at least a portion of the real-time data for managing the orders of the units of the item.

19. The system of claim 12, wherein changing updating the at least one of: the labor forecast or the capacity forecast comprises:
re-simulating the supply and demand based at least in part on the real-time data and on different labor constraints or capacity constraints to estimate profitability levels associated with inventorying the item; and
selecting a labor constraint or a capacity constraint that maximizes a profitability level.

* * * * *

UNITED STATES PATENT AND TRADEMARK OFFICE
CERTIFICATE OF CORRECTION

PATENT NO. : 10,360,522 B1
APPLICATION NO. : 14/749016
DATED : July 23, 2019
INVENTOR(S) : Edward Michael Leonard et al.

Page 1 of 1

It is certified that error appears in the above-identified patent and that said Letters Patent is hereby corrected as shown below:

In the Claims

Column 18, Line 13, Claim 1:
Delete: "units of the items during the planning the planning horizon"
Insert: -- units of the items during the planning horizon --

Column 20, Line 38, Claim 12:
Delete: "during the planning the planning horizon, and"
Insert: -- during the planning horizon, and --

Signed and Sealed this
Fifth Day of November, 2019

Andrei Iancu
*Director of the United States Patent and Trademark Office*